(12) United States Patent
May

(10) Patent No.: US 11,876,558 B2
(45) Date of Patent: Jan. 16, 2024

(54) SECURE LINE-OF-SIGHT COMMUNICATION WITH AIRCRAFT

(71) Applicant: Joshua May, San Diego, CA (US)

(72) Inventor: Joshua May, San Diego, CA (US)

( * ) Notice: Subject to any disclaimer, the term of this patent is extended or adjusted under 35 U.S.C. 154(b) by 414 days.

(21) Appl. No.: 17/180,787

(22) Filed: Feb. 20, 2021

(65) Prior Publication Data

US 2021/0226703 A1    Jul. 22, 2021

Related U.S. Application Data

(63) Continuation-in-part of application No. 16/748,165, filed on Jan. 21, 2020, now abandoned.

(60) Provisional application No. 62/989,508, filed on Mar. 13, 2020.

(51) Int. Cl.
| | |
|---|---|
| *H04B 10/112* | (2013.01) |
| *H04L 9/40* | (2022.01) |
| *B64C 39/02* | (2023.01) |
| *B64U 101/20* | (2023.01) |
| *G06V 30/10* | (2022.01) |
| *H04B 10/40* | (2013.01) |
| *G06V 20/58* | (2022.01) |
| *B64U 10/10* | (2023.01) |
| *G06V 20/62* | (2022.01) |

(52) U.S. Cl.
CPC ........ *H04B 10/1123* (2013.01); *B64C 39/028* (2013.01); *G06V 20/584* (2022.01); *H04B 10/1127* (2013.01); *H04B 10/1129* (2013.01); *H04B 10/40* (2013.01); *H04L 63/0428* (2013.01); *B64U 10/10* (2023.01); *B64U 2101/20* (2023.01); *B64U 2201/104* (2023.01); *G06V 20/625* (2022.01); *G06V 30/10* (2022.01)

(58) Field of Classification Search
None
See application file for complete search history.

(56) References Cited

U.S. PATENT DOCUMENTS

| 5,038,406 A * | 8/1991 | Titterton ................ H04B 10/11 398/107 |
| 5,264,955 A | 11/1993 | Sakanaka |
| 5,552,920 A | 9/1996 | Glynn |
| 6,285,476 B1 | 9/2001 | Carlson |
| 6,901,220 B1 | 5/2005 | Carlson |

(Continued)

*Primary Examiner* — Nancy Bitar
(74) *Attorney, Agent, or Firm* — Kirk A. Buhler; Buhler & Associates Patenting

(57) ABSTRACT

Improvements in secure communication using drones. The communication uses aircraft to provide a secure communication link that prevents undesirable reception. The secure link can be between two people, groups or more specific people. Optical transmission can be from laser, infrared, ultraviolet, white light or a particular wavelength of light. One or multiple of aircraft to relay information between senders and receivers. The aircraft can be drones that operate within buildings or with overhead aircraft. The aircraft can intelligently follow or lead a person to maintain a line-of-sight. Each user can have their own tracking aircraft and the aircraft can communicate between each other using light and/or wireless communication to optimize line-of-sight between the aircraft over geographic medium. The geographic medium may include one or more of terrain, air, water, and space. The object may be a soldier, vehicle, drone, or ballistic.

16 Claims, 7 Drawing Sheets

(56) References Cited

U.S. PATENT DOCUMENTS

Figure 1:
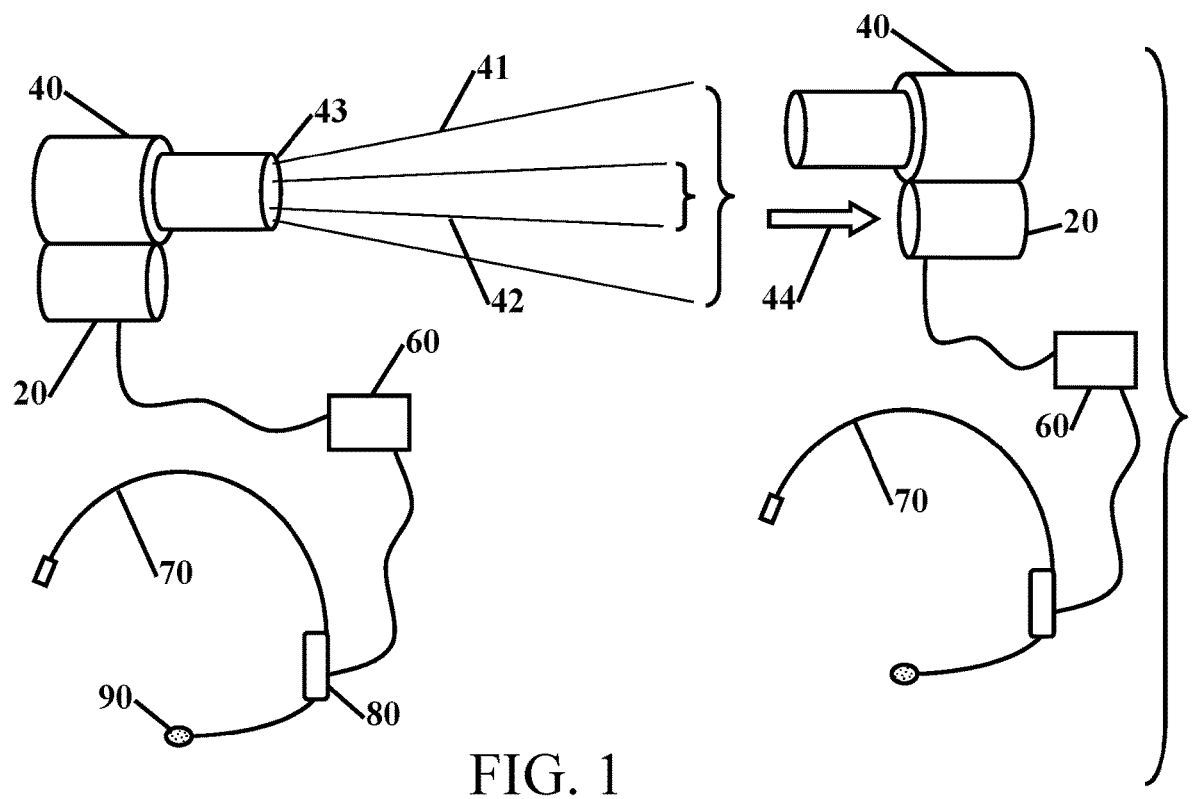

| | | |
|---|---|---|
| 8,554,084 B2 | 10/2013 | Song et al. |
| 2015/0245448 A1 | 8/2015 | Readler |
| 2017/0069214 A1* | 3/2017 | Dupray ................ G08G 5/0008 |
| 2017/0230118 A1 | 8/2017 | Shatz et al. |
| 2019/0045348 A1* | 2/2019 | Li ......................... H04W 16/28 |
| 2020/0372807 A1* | 11/2020 | Li ......................... G08G 5/0056 |

* cited by examiner

SECURE LINE-OF-SIGHT COMMUNICATION WITH AIRCRAFT

CROSS REFERENCE TO RELATED APPLICATIONS

This application claims the benefit of Provisional Application Ser. No. 62/989,508 filed Mar. 13, 2020, is a continuation-in-part of applicant's co-pending application Ser. No. 16/748,165 filed Jan. 21, 2020 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a secure communication between two or more people or groups. More particularly, the present secure line-of-sight communication with aircraft creates a communication system whereby light is used to communicate and the light can be received and directed using aircraft that adjust their position to maintain line-of-sight between the two or more people or groups and the aircraft to communicate about a moving object.

Description of Related Art Including Information Disclosed Under 37 CFR 1.97 and 1.98

There are several circumstances where secure communication is necessary to prevent ease dropping by other. One of the most common methods for secure communication is with radio waves and an encrypted signal. The major problem with radio communication is that radio waves transmit in all directions and once the signal has been decrypted the communication is no longer secure. Another method of communication is with a laser where the beam is directed to a specific point where the optical signal can be received and converted into audio or other data. The major problem with this type of communication is that it requires a fairly tight beam of light and reception. It either the sender or receiver moves or is blocked by and object the line-of-sight can be disrupted.

A number of patents and or publications have been made to address these issues. Exemplary examples of patents and or publication that try to address this/these problem(s) are identified and discussed below.

U.S. Pat. No. 6,285,476 issued on Sep. 4, 2001 to Robert T. Carlson et al., and is titled Laser Communication System and Method. This patent discloses a laser communication system for full duplex wideband data transmission includes first and second terminals having dichroic wavelength-multiplexed optical systems wherein transmitted and received light are multiplexed along a path through the same aperture. The optical systems each preferably comprise a cassegrain receiver having primary and secondary mirrors for directing both transmitted and received laser light. While this patent discloses a light communication system it works with laser light with a very narrow light beam and does not allow for movement between the transmitter and the receiver.

U.S. Pat. No. 8,554,084 issued on Oct. 8, 2013 to Jae-Seung Song et al., and is titled Apparatus and method for visible light communication. This patent discloses an apparatus for transmitting Visible Light Communication (VLC) data, in which a data processor processes data to be transmitted, a modulator modulates data received from the data processor into a signal for VLC, a light output unit outputs light of a predetermined color and includes in the light a signal of any selected one characteristic among signals of two different characteristics, and a light output controller selects at least one of the signals of different characteristics, and controls the light output unit so that a signal from the modulator is output through the signal of the selected characteristic. This patent uses lights in fixed locations and does not operate with moving senders and receivers.

U.S. Publication Number 2015/0245448 was published on Aug. 27, 2015 to Readler, Blaine Clifford and is titled Encoded Light-Activated Illumination. This publication discloses a method for controlling detached lighting units uses source light of a capable flashlight to communicate information. The capable flashlight encodes an ID Tag in modulated light, and the detached lighting units recognize the specific ID Tag and responds, for example by activating and creating illumination. This publication does not use bi-directional communication.

U.S. Publication Number 2017/0230118 was published on Aug. 10, 2017 to Narkis E. Shatz et al., and is titled Transmitters for Optical Narrowcasting. This publication discloses a method for controlling detached lighting units uses source light of a capable flashlight to communicate information. The capable flashlight encodes an ID Tag in modulated light, and the detached lighting units recognize the specific ID Tag and responds, for example by activating and creating illumination. This publication does not use bi-directional communication.

What is needed is a narrow beam light communication that can operate with moving sender and receiver. The proposed secure line-of-sight communication with aircraft uses aircraft(s) that receives and transmits light communication sources to communicate around solid objects where light will not transmit through.

BRIEF SUMMARY OF THE INVENTION

It is an object of the secure line-of-sight communication with aircraft to provide a secure communication link that prevents reception. The secure link can be between two people or more specific people. Additional people can be added or removed from the communication group by altering where the signal is sent.

It is an object of the secure line-of-sight communication with aircraft to use an optical data transmission mechanism. The optical transmission can be from laser, infrared, ultraviolet, white light or a particular wavelength of light. Depending upon the wavelength of the light, the light could appear as ambient light or from a flashlight if it was observed in different levels of natural light.

It is another object of the secure line-of-sight communication with aircraft to use one or a multiple of aircraft to relay information between senders and receivers. The aircraft can be drones that operate within buildings or with overhead aircraft. The aircraft move within 3-D space to remain in line-of-sight between two parties using one or a plurality of aircraft.

It is another object of the secure line-of-sight communication with aircraft for the aircraft to automatically determining one or more of a predicted location or range of locations for the moving two or more specific people for a potential path of travel. The aircraft can provide an alert for other moving objects in the vicinity with an alert concerning the moving object(s) or people, and providing the alert. The automatically determining may be further based on one or more historical traits concerning the object(s), and the geographic medium the object is moving through. The geographic medium may include one or more of terrain, air, water, and space. The object may be a soldier, vehicle, or drone. As described further below, the object may also be a ballistic. The automatically determining may be further based on one or more historical traits concerning the object, and the geographic medium the object is moving through. The geographic medium may include one or more of terrain, air, water, and space. The object may be a soldier, vehicle, or drone. As described further below, the object may also be a ballistic.

It is another object of the secure line-of-sight communication with aircraft for the aircraft to receive and detect the moving object information that may only be detected from an elevated position. The aircraft can receive historical traits and trends associated with the moving object, including statistical movement characteristics of the object, the statistical movement characteristics including acceleration and speed ability of the identified object; and adjusting the maximum acceleration, maximum speed, and maximum reachable range for the object as a function of geographic mediums that the object will move through in time over the projected course and trajectory of the object. In some embodiments, the method considers average speeds a particular object may traverse a particular geographic medium.

It is still another object of the secure line-of-sight communication with aircraft where the aircraft can intelligently follow or lead a person to maintain a line-of-sight. Each user can have their own tracking aircraft and the aircraft can communicate between each other using light and/or wireless communication to optimize line-of-sight between the aircraft.

It is still another object of the secure line-of-sight communication with aircraft where the communication for transmission or reception is with a mobile device such as a phone or table where transmission can be with the screen or flash and the reception can be with the camera.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

Figure 2:
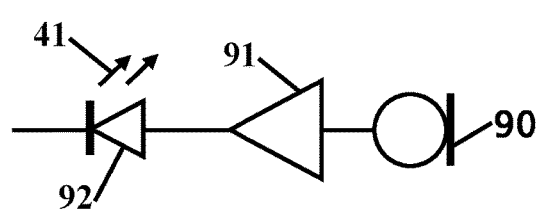
Figure 3:
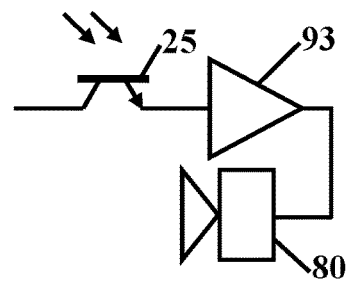
Figure 4:
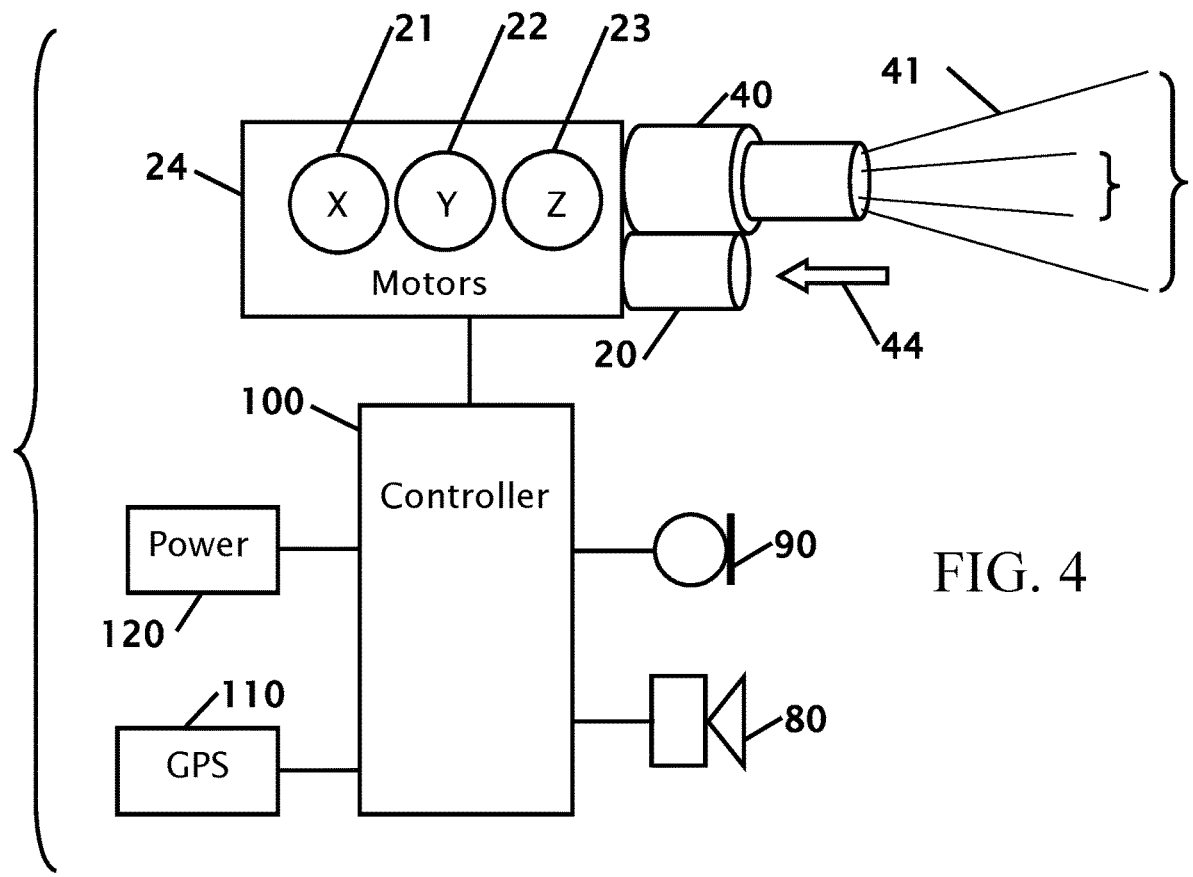
Figure 5:
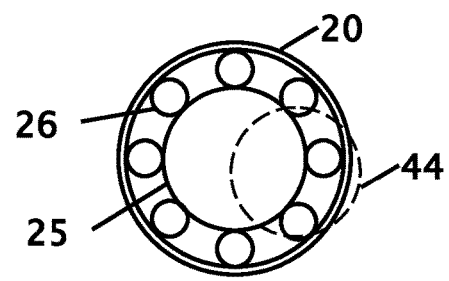
Figure 6:
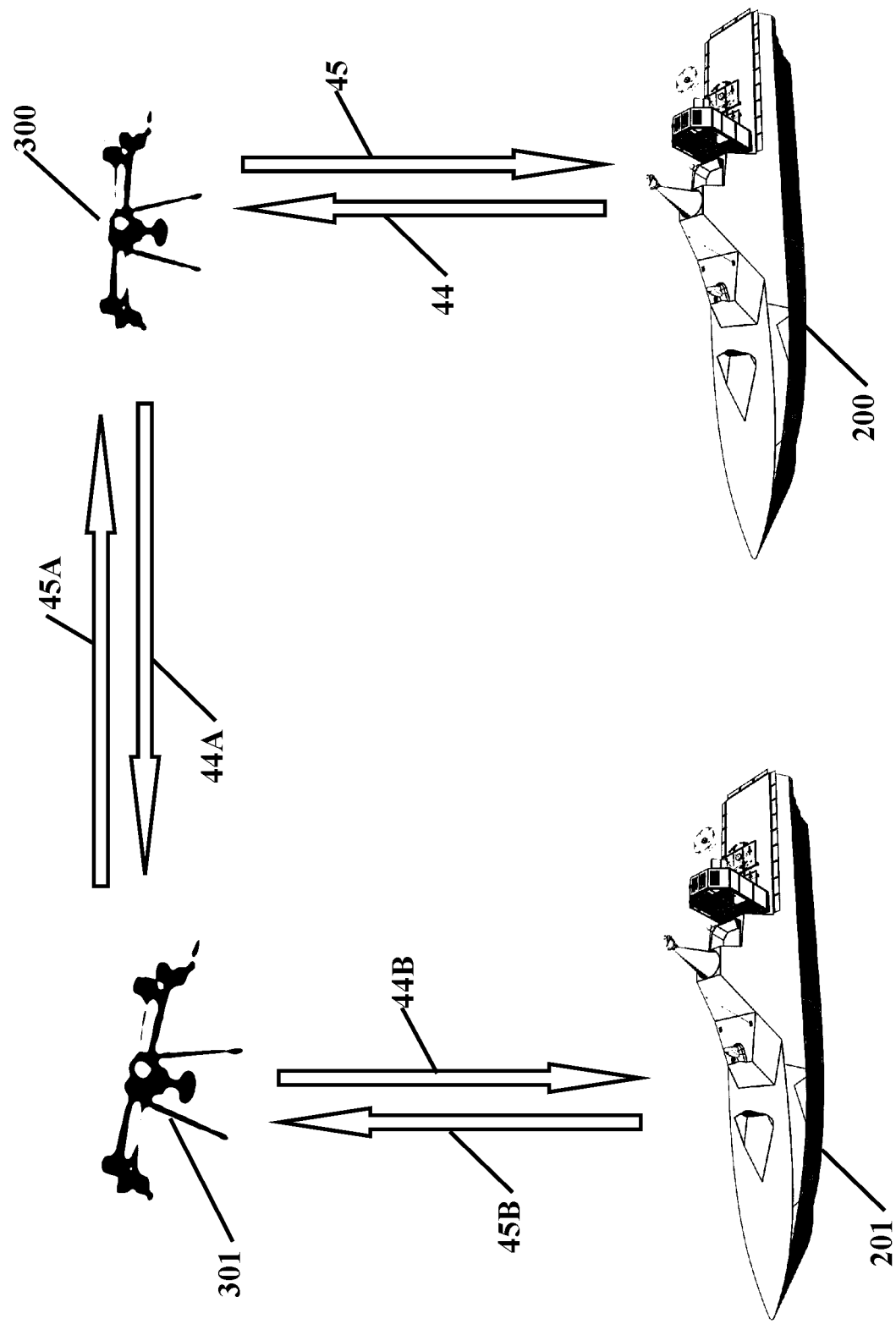
Figure 7:
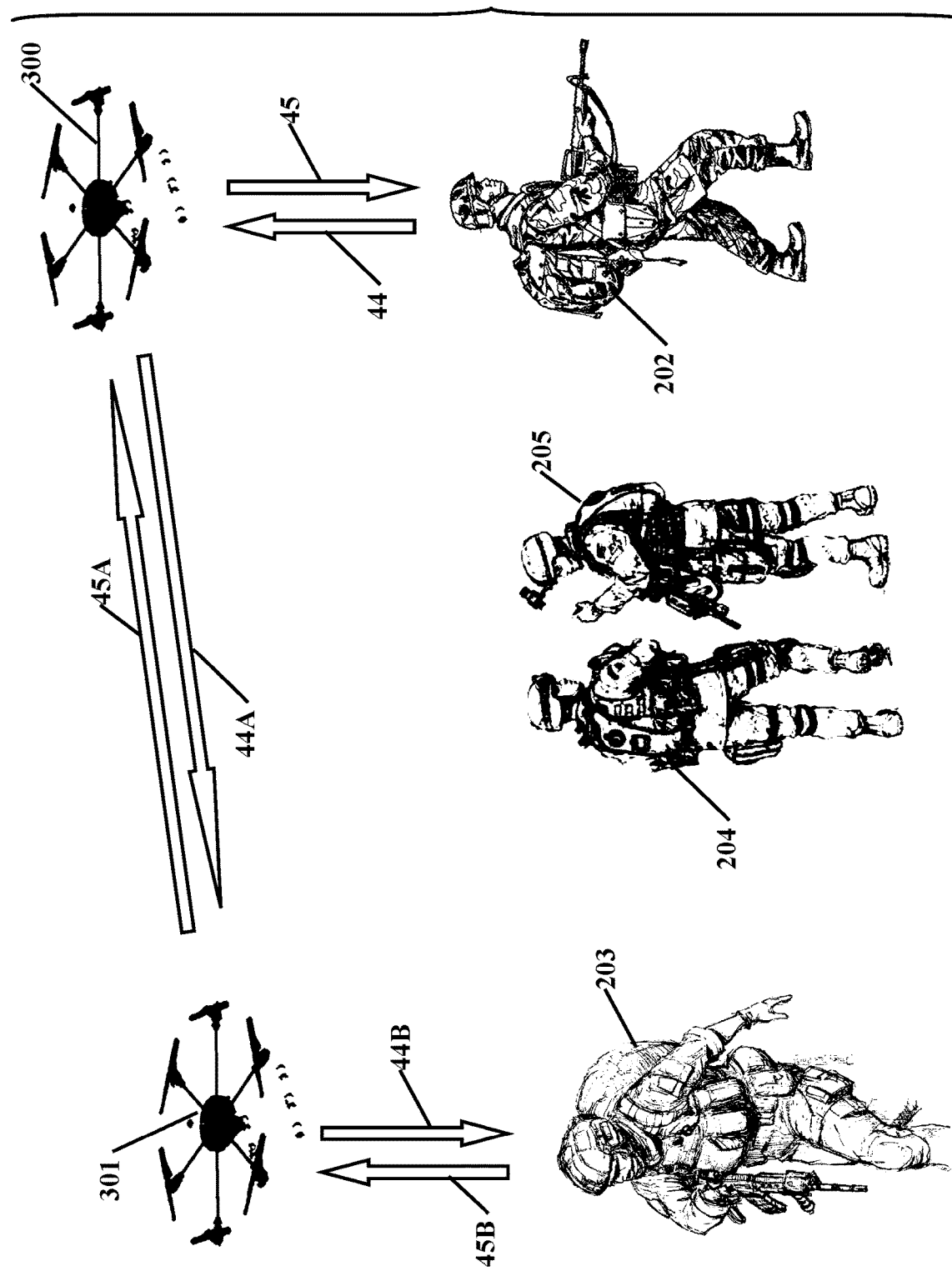
Figure 8:
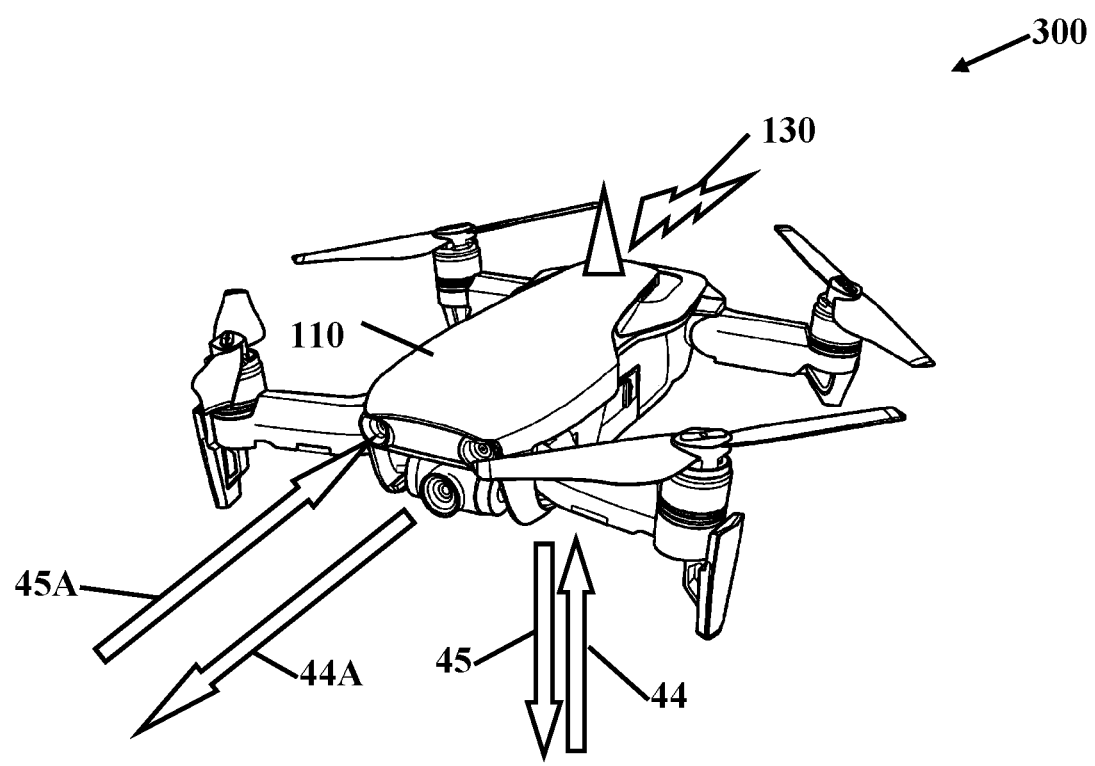
Figure 9:
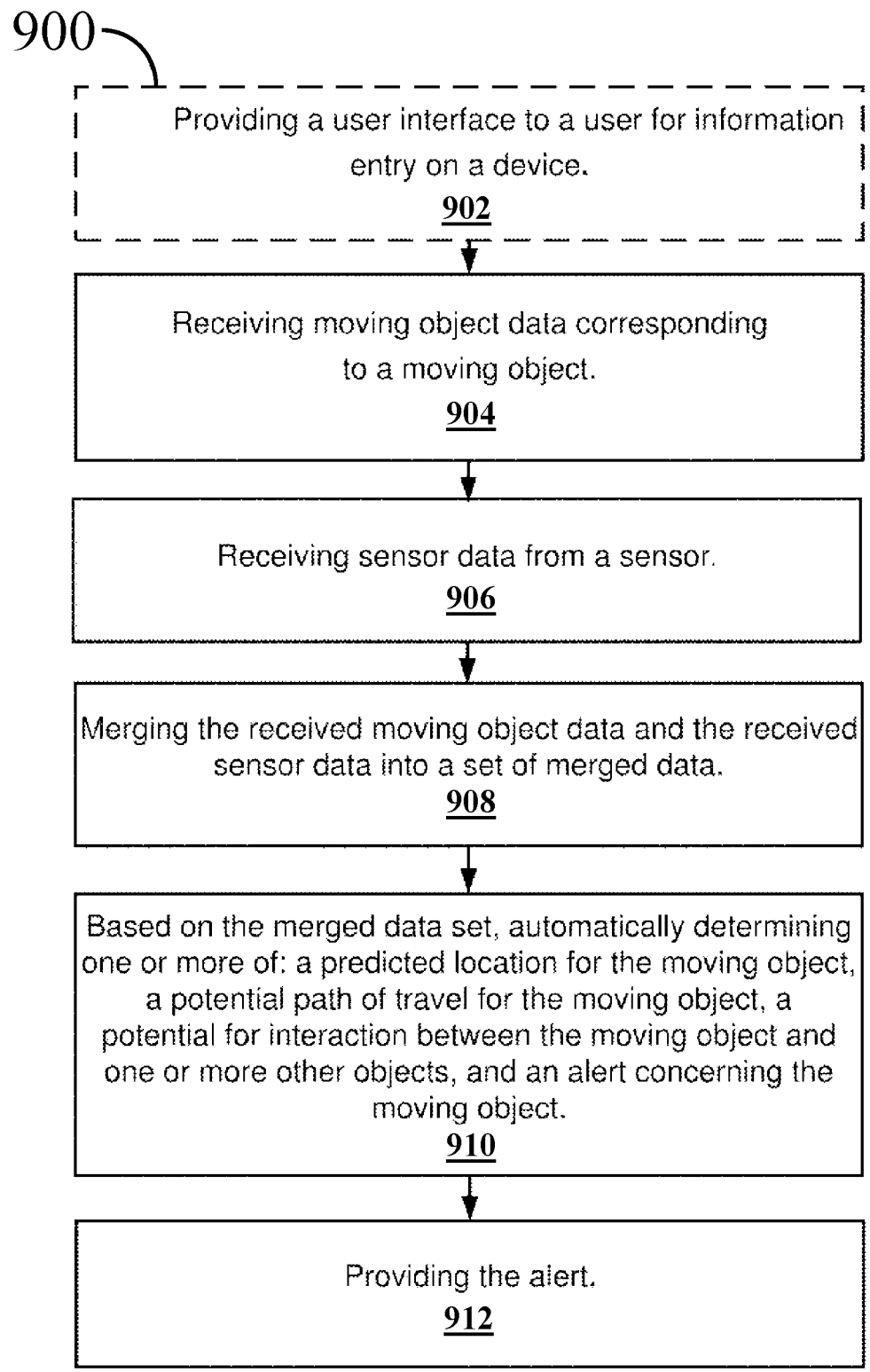
Figure 10:
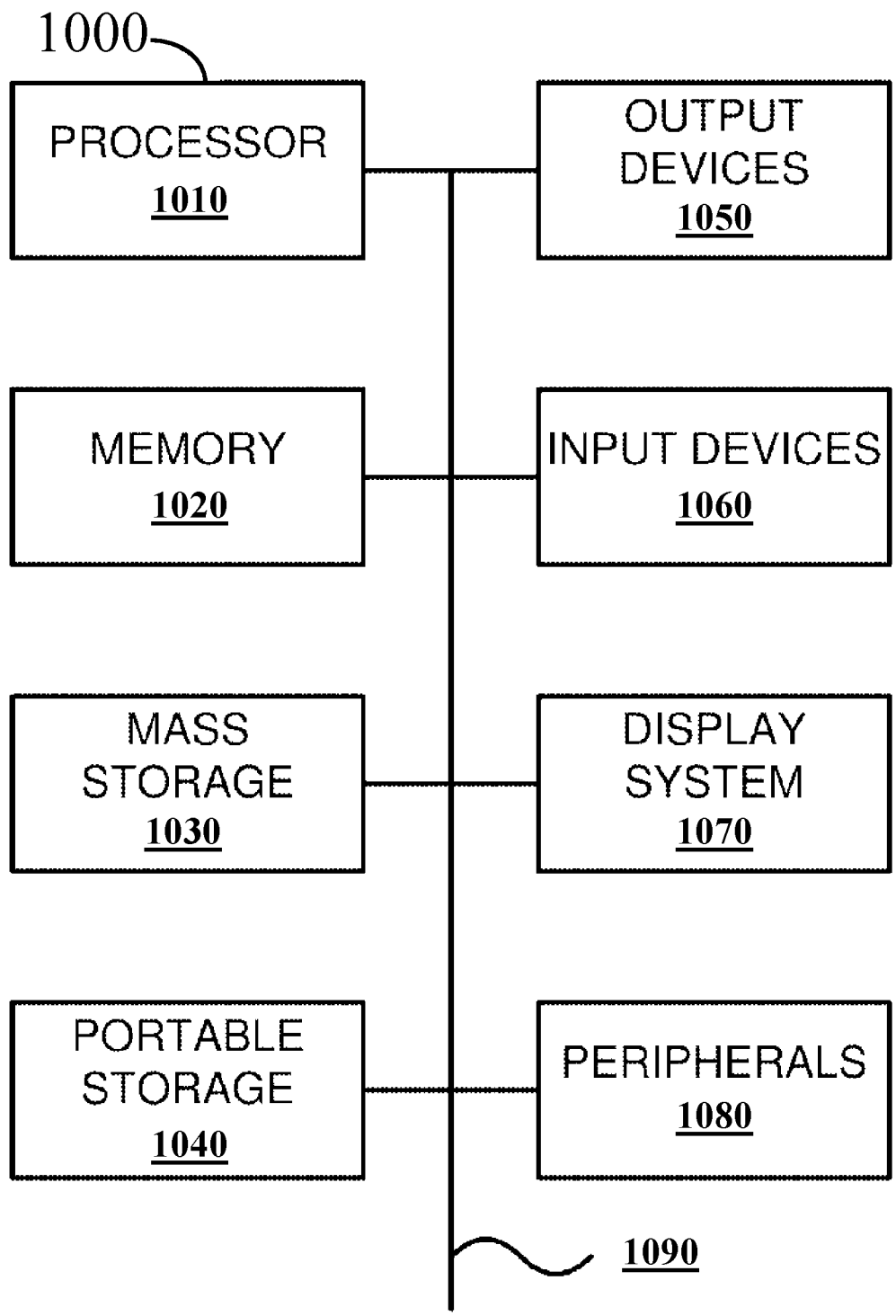

FIG. 1 shows a secure line-of-sight communication system.
FIG. 2 shows a transmitter system.
FIG. 3 shows a receiver system.
FIG. 4 shows a control system for the line-of-sight communication system.
FIG. 5 shows a centering receiver.
FIG. 6 shows a secure line-of-sight communication with aircraft.
FIG. 7 shows another embodiment of a secure line-of-sight communication with aircraft.
FIG. 8 shows a line-of-sight drone.
FIG. 9 shows a block diagram of an operational flow chart of a method, according to an example embodiment.
FIG. 10 shows a simplified block diagram of a computing system, according to some embodiments.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

| Item Numbers and Description | |
|---|---|
| 20 | optical receiver |
| 21 | X motor |
| 22 | Y motor |
| 23 | Z motor |
| 24 | housing |
| 25 | sensor |
| 26 | rim sensor(s) |
| 40 | optical transmitter |
| 41 | broad beam |
| 42 | narrow beam |
| 43 | lens |
| 44 | signal |
| 45 | return signal |
| 60 | controller |
| 70 | headset |
| 80 | speaker |
| 90 | microphone |
| 91 | amplifier |
| 92 | emitter |
| 93 | amplifier |
| 100 | controller |
| 110 | GPS |
| 120 | power |
| 130 | wireless communication |
| 200 | first craft |
| 201 | second craft |
| 202 | first user |
| 203 | second user |
| 204 | non-user |
| 205 | non-user |
| 300 | first drone |
| 301 | second drone |
| 900 | flow diagram |
| 902 | user interface |
| 904 | receive data |
| 906 | receive sensor data |
| 908 | merge data |
| 910 | determining |
| 912 | provide alert |
| 1000 | computer system |
| 1010 | processor |
| 1020 | memory |
| 1030 | mass storage |
| 1040 | portable storage |

-continued

| Item Numbers and Description | |
|---|---|
| 1050 | output device |
| 1060 | input device |
| 1070 | display system |
| 1080 | peripherals |
| 1090 | single bus |

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

FIG. 1 shows a secure line-of-sight communication system. This figure shows a general pictorial diagram of a communication system for two separate users for using light communication. Each user has a headset 70 with a controller 60 that connects to an optical transmitter 40 and an optical receiver 20. While the system shows that both users have both an optical transmitter 40 and an optical receiver 20, one user can have an optical transmitter 40 with multiple people having optical receivers 20. The optical transmitter 40 has a light source that transmits a signal 44 through a lens 43.

The headset 70 has a microphone 90 that receives an audible signal from a user and a speaker 80 where the user can hear a signal 44 from their optical receiver 20. The controller 60 can operate with a common headset 70 to convert the signals to and from the optical transmitter 40 and an optical receiver 20. Collectively the optical transmitter 40 and an optical receiver 20 can be called a transceiver. The signal 44 can also be received by a phone, tablet, computer, goggles, wrist mounted screen or watch where it can be viewed.

The light source can be from laser, infrared, ultraviolet, white light or a particular wavelength of light. Depending upon the wavelength of the light, the light could appear as ambient light or from a flashlight if it was observed in different levels of natural light. The optical transmitter 40 has a lens 43 that can be adjusted to alter the width of the transmission beam from a narrow beam 42 to a broad beam 41 or any variation therein between. The width of the beam allows for a wider or narrow person or group of people to receive the signal. The signal 44 is detected by the optical receiver 20 where the optical signal is converted back into an audible should. While this example shows and describes transmission and reception of an audible signal, it should be understood that the signal could be data.

FIG. 2 shows a transmitter system. This is a fairly simplified circuit without a power source and support circuitry. In the circuit a signal from a microphone 90 is received and connects to an amplifier 91 that amplifies the signal to a level that will drive an emitter 92 to produce an optical broad beam 41. A lens can then narrow the broad beam 41 to reduce the potential for the signal to be received by undesirable people. While this example shows the emitter 92 is a light emitting diode (LED) other illumination light sources are contemplated. In general, the emitter 92 needs to have a fast enough response to accommodate the frequency of the audio or digital signal.

FIG. 3 shows a receiver system. This is a fairly simplified circuit without a power source and support circuitry. The optical signal is received by a sensor 25 and passes through an amplifier 93 so the signal can be heard from the speaker 80. The sensor 25 can be tuned to a receive a particular wavelength of light to filter out undesirable signal and to only receive signal from the optical transmitter.

In some uses of the secure line-of-sight communication, the person sending and the person receiving the signal are at fixed positions where the optical transmitter and the optical receiver simply point to each other. There are many other instances where one or both of the transmitter and receiver a moving and both the transmitter and the receiver must continue to more or adjust their orientation and/or position to maintain the line-of-sight. This requires one or a plurality of motors to adjust X, Y, Z and or yaw, pitch and roll.

FIG. 4 shows a control system for the line-of-sight communication system. In this embodiment the optical receiver 20 and the optical receiver 40 is mounted to a housing 24. The housing 24 has a plurality of motors, such as an X motor 21, a Y motor 22, and a Z motor 23 to position and orientate the optical receiver 20 and the optical receiver 40 to maintain a line-of-sight. This embodiment shows a controller 100 that controls and positions the motors. A power 120 source provides power to the system and amplifies the signal from the microphone 90 to the optical transmitter and amplifies the signal 44 from the optical receiver 20 to the speaker 80. Multiple units can be used to communicate. The optical beam can be a broad beam 41 or a narrow beam to include or exclude a larger or smaller number of people that can receive and interact.

In deployment, the location and position between the users may not be known. To allow for initial positioning the two (or more) a global positioning sensor (GPS) can find the position and direction of each device and may use a wireless radio signal to establish an initial position to align the line-of-sight beams.

FIG. 5 shows a centering receiver. To maintain that a receiver keeps the line-of-sight aligned the optical receiver 20 uses a sensor 25 with a plurality of rim sensors 26. In this figure, the signal 44 is shown with broken lines. The previously identified controller 100 can monitor the plurality of rim sensors 26 to determine an alignment of the signal 44 with the sensor 25. Depending upon the rim sensors 26 that receive the signal, the motors 21, 22 and 23 are operated to increase the amount of signal 44 that reaches the sensor 25.

FIG. 6 shows a secure line-of-sight communication with aircraft. This example shows communication with ocean vessels that typically use radio frequencies to communicate. Radio waves transmit omni-directional and can be easily received by anyone within range of the signal. One problem with water and land craft is curvature of the earth that can block signals. Radio signals can be sent to satellites that replicate the signal that can make it easier for additional people to receive the signal. In this figure the line-of-sight signal 44 going out or the return signal 45 can be sent from a first craft 200 to a first drone 300 that can be launched from the first craft 200 or from a moving vehicle, a stationary location, a roving vehicle, another craft or from land. The first drone 300 can remain above or near the first craft 200 and can send a signal 44A and a return signal 45A to a second drone 301 that is above or near a second craft 201. The communication from the first craft 200 can then be sent from the second drone 301 with a signal 44B and a return signal 45B to provide a secure line-of-sight communication. The first drone 300 and the second drone 301 use a variety of sensors to maintain line-of-sight signals. The signal 44, 44A, 44B and/or return signal 45, 45A, 45B can be voice and/or data communication that can be heard or shown in a screen such as on a phone, computer, tablet or wrist mounted display.

FIG. 7 shows another embodiment of a secure line-of-sight communication with aircraft. In a battle situation, users such as a first 202 user and a second user 203 can move in and around a battle zone or other area where line-of-sight between the users 202 and 203 can be blocked by topography or by walls or structures. While this example shows a first drone 300 and a second drone 301, it is contemplated that a single drone can be used receive and relay a signal from the first user 202 and the second user 203.

The first drone 300 can remain above or near the first user 202 and can send a signal 44A and a return signal 45A to a second drone 301 that is above or near a second user 203. The communication from the first user 202 can then be sent from the second drone 301 with a signal 44B and a return signal 45B to provide a secure line-of-sight communication. The drones 300 and 301 are able to communicate with the users 202 and 203 to move and maintain a stable and secure communication without non-users 204 and 205 from intercepting the signals 44 and 45. The system can include additional users in the communication loop with additional drones or by altering the transmission beam.

FIG. 8 shows a line-of-sight drone such as a first drone 300. This drone 300 has at least a sending and receiving modules on the bottom of the drone and at a side of the drone. This allows for a signal 44 and a return signal 45 from the bottom of the drone and a signal 44A and a return signal 45A from a side of the drone. To allow for initial positioning the two (or more) a global positioning sensor (GPS) can find the position and direction of each device and may use a wireless communication radio signal to establish an initial position to align the line-of-sight beams.

The drone(s) also have the ability to monitor and view the area around the people in the secure communication environment. The drone(s) can add additional secure communication to the members based upon other people and hazards. It should be appreciated that the present technology is not limited to the objects being hazards; other objects may be moving and processed to the present technology to maintain a communication link. In addition, although some examples herein are described with respect to moving hazards that a person, police or military member could encounter in the field or on the road, the present technology is not limited to that type of moving hazards.

In various embodiments, the determination of the travel trajectory can be based on the route and destination for the user. The destination can be determined variously, for example, based on navigation system communication, user input/selection, or predicted based on historical data that can show a pattern of having certain destinations at the time and place of the trip, based on past destinations for the route taken, based on the user's calendar or other information the user had provided, with different weights given to the information depending on the source of the information, e.g., less weight to destinations based on distant history and more weight to destinations based on the venue for an event.

For movement prediction in various embodiments, the form of movement needs to be matched with the polygon representing calculated potential locations within a determined timeframe based on mobility physics of the object, for example a person can physically run at maximum measured maximum speed of nearly 28 MPH (e.g., world's fastest runner Usain Bolt in the 100-Meter Sprint). The average vehicle has an average maximum speed of between 100-120 miles per hour. In various embodiments, the method calculates the average maximum speed of an identified object/person/vehicle, along with conditions of the object's terrain and the limited mobility and speed based on same (i.e. hills, pavement condition, curves in road, etc.) and calculates the maximum acceleration rate of a moving object (which could be a person, vehicle, or other object) along with its average calculated maximum speed and adjusts the algorithm in real time using the actual geo-location and relative movement against this algorithm to determine the earliest potential opportunity for an encounter (e.g., with the moving hazard, person, vehicle, etc.,). This can create a level of awareness for all users that will allow for appropriate preparation of possible encounter.

For example, drones or other automated sensing devices can be used to monitor and/or identify a moving object and take various actions. In some embodiment, one or more drones are launched in response to a report of a moving object. Drones can be launched from other moving vehicles, from stationary stored locations, or from roving vehicles tasked to follow tagged objects. The moving object can be detected by the drone(s), (e.g., based on the initial report with descriptors), reported, tagged and followed. Some embodiments provide a unique identifier for any target moving object; use a network of available sensors from moving vehicles, fixed points, etc.; and deliver data to a central system for later identification and tracking. This system may be cloud-based and could be decentralized for increased security and capability.

Exemplary methods include a system for real-time tracking using, for examples, drones and/or networked sensor technology. In some embodiments, drones or other sensor carrying devices (hard mounted or mobile including law enforcement vehicles and autonomous vehicles) identify and image targets using sensors such as photo, laser, lidar, infrared, radar, sonic, etc. to identify a target's unique identity (e.g., turning objects into their own QR codes, in essence) so other networked sensor systems can help recognize and update target location and other target deltas to the central system.

In some embodiments, the method can calculate the movement of an object in any predictable direction based on the movement range and characteristics of that object, including rate of acceleration and range of speed. Such embodiments may aid, for example, in the tracking of drones or other drones that could pose a danger to vehicles, or people.

For hiking app integration, for instance, the method may track hikers, mountain bikers, rock climbers, ice climbers, etc. The method may detect a rock-climbing fall, general fall, or other hazardous movement and have a "life alert" two-way communication if a person is disabled from a fall. If there is no response from climber or hiker to an alert, the method can alert others (where "others" as used herein may include people, robots (e.g., "robot doctors"), autonomous vehicles, drones, and the like) in the area with location information to provide help for the injured person. Other kinds of problems that may occur on the hiking trail albeit a sprained ankle, dehydration, lost, etc. could also be reported. In addition, the presence of dangerous animals could be detected by various embodiments or reported by other, including the presence of bears, rattlesnakes, mountain lions, etc. The last known location of such moving hazards (or other objects) could be sent to authorities, rangers, and hikers in the area.

FIG. 9 is a simplified flow diagram 900 of an example method, according to some embodiments, with further details described herein. While for some the communication is only voice, the system can support input from a wrist mounted device, phone, tablet or computer with the communication exchanged to others. The flow diagram 900 has optional Step 902, as indicated by the dashed line, and includes providing a user interface to a user for information entry on a device, as described further herein.

Step 904 includes receiving (optionally via the user interface), moving object data corresponding to a moving object, as described further herein. Step 906 includes, receiving sensor data from a sensor, as described further herein. Step 908 includes merging the received moving object data and the received sensor data into a set of merged data, as described further herein. The user interface can be from a camera in the drone that provides one or more of: three dimensions; virtual reality interaction; and augmented reality interaction to in a phone, computer, heads-up display, or wrist mounted display.

Step 910 includes based on the merged data set, automatically determining one or more of: a predicted location for the moving object, a potential path of travel for the moving object, a potential for interaction between the moving object and one or more other objects, and an alert concerning the moving object, as described further herein. Step 912 includes providing the alert, as described further herein.

In some contemplated embodiments, the present technology is a system (and corresponding method) that provides a service where third parties are providing inputs and those third parties or others are receiving outputs from the system. Inputs could include all types of sensor data pertaining to users and moving objects (e.g., that could be classified as hazards), and third-party consumption of both that same data as well as receiving outputs from the system. Outputs received by the third-party provider could include additional information generated by the system pertaining to predictions determined concerning, but not limited to, approximation and estimation of future location, proximity, trajectory and routing.

For one non-limiting example, the method can further include providing the merged data set to a third-party provider, e.g., for generating a predicted location for the moving hazard (or other object), at least one potential path of travel for the moving hazard (or other object), and/or a potential for interaction between the first user and the moving hazard (or another object), and for generating and transmitting an alert.

FIG. 10 illustrates an exemplary computer system 1000 that may be used to implement some embodiments of the present invention. The computer system 1000 in FIG. 10 may be implemented in the contexts of the likes of computing systems, networks, servers, or combinations thereof. The computer system 1000 in FIG. 10 includes one or more processor unit(s) 1010 and main memory 1020. Main memory 1020 stores, in part, instructions and data for execution by processor unit(s) 1010. Main memory 1020 stores the executable code when in operation, in this example. The computer system 1000 in FIG. 10 further includes a mass data storage 1030, portable storage device 1040, output devices 1050, user input devices 1060, a graphics display system 1070, and peripheral device(s) 1080.

The components shown in FIG. 10 are depicted as being connected via a single bus 1090. The components may be connected through one or more data transport means. Processor unit(s) 1010 and main memory 1020 are connected via a local microprocessor bus, and the mass data storage 1030, peripheral device(s) 1080, portable storage device 1040, and graphics display system 1070 are connected via one or more input/output (I/O) buses.

Mass data storage 1030, which can be implemented with a magnetic disk drive, solid state drive, or an optical disk drive, is a non-volatile storage device for storing data and instructions for use by processor unit(s) 1010. Mass data storage 1030 stores the system software for implementing embodiments of the present disclosure for purposes of loading that software into main memory 1020.

Portable storage device 1040 operates in conjunction with a portable non-volatile storage medium, such as a flash drive, floppy disk, compact disk, digital video disc, or Universal Serial Bus (USB) storage device, to input and output data and code to and from the computer system 1000 in FIG. 10. The system software for implementing embodiments of the present disclosure is stored on such a portable medium and input to the computer system 1000 via the portable storage device 1040.

User input devices 1060 can provide a portion of a user interface. User input devices 1060 may include one or more microphones, an alphanumeric keypad, such as a keyboard, or touch screen, for inputting alphanumeric and other information, or a pointing device, such as a mouse, a trackball, stylus, or cursor direction keys. User input devices 1060 can also include a touchscreen. Additionally, the computer system 1000 as shown in FIG. 10 includes output devices 1050. Suitable output devices 1050 include speakers, printers, network interfaces, and monitors.

Graphics display system 1070 include a liquid crystal display (LCD), light emitting diode (LED) or organic light emitting diode (OLED) or other suitable display device. Graphics display system 1070 is configurable to receive textual and graphical information and processes the information for output to the display device. Peripheral device(s) 1080 may include any type of computer support device to add additional functionality to the computer system.

Some of the components provided in the computer system 1000 in FIG. 10 can be those typically found in computer systems that may be suitable for use with embodiments of the present disclosure and are intended to represent a broad category of such computer components. Thus, the computer system 1000 in FIG. 10 can be a personal computer (PC), hand held computer system, telephone, mobile computer system, workstation, tablet, phablet, mobile phone, watch, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1000 may be implemented as a cloud-based computing environment, such as a virtual machine operating within a computing cloud. In other embodiments, the computing system 1000 may itself include a cloud-based computing environment, where the functionalities of the computing system 1000 are executed in a distributed fashion. Thus, the computing system 1000, when configured as a computing cloud, may include pluralities of computing devices in various forms, as will be described in greater detail below.

Thus, specific embodiments of a secure line-of-sight communication with aircraft have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A secure line-of-sight communication with aircraft comprising:
   a first user with a first line-of-sight transceiver to a second line-of-sight transceiver on a first aircraft; said first aircraft having a third line-of-sight transceiver;
   a second user with a fourth line-of-sight transceiver to a fifth line-of-sight transceiver on a second aircraft; said second aircraft having a sixth line-of-sight transceiver that communicates to said third line-of-sight transceiver on said first aircraft;
   said first aircraft and said second aircraft that relays signals between said first user to said second user;
   at least one of said first aircraft and said second aircraft further includes at least one sensor or camera that detects hazards below or above at least one of said first aircraft and said second aircraft, and said at least one of said first aircraft and said second aircraft includes at least a centering receiver that includes at least one motor that redirects an alignment of an optical receiver and one tracking device that maintains a line-of-sight between said first user, said first aircraft, said second aircraft and said second user; said first aircraft adjusts its position to maintain communication between said first user and said second aircraft and said second aircraft adjusts its position to maintain communication between said first aircraft and said user.

2. The secure line-of-sight communication with aircraft according to claim 1, wherein said secure line-of-sight communication with aircraft wherein said aircraft is a drone.

3. The secure line-of-sight communication with aircraft according to claim 1, wherein said secure line-of-sight communication with aircraft wherein said line-of-sight includes an optical transmission.

4. The secure line-of-sight communication with aircraft according to claim 3, wherein said secure line-of-sight communication with aircraft wherein said optical transmission is laser, infrared, ultraviolet, white light or a particular wavelength of light.

5. The secure line-of-sight communication with aircraft according to claim 1, wherein said transceiver is a cell phone having an illuminating device and a camera.

6. The secure line-of-sight communication with aircraft according to claim 1, wherein said signal is a voice communication.

7. The secure line-of-sight communication with aircraft according to claim 1, wherein said signal is a data communication.

8. The secure line-of-sight communication with aircraft according to claim 7, wherein said data communication is displayed on a screen.

9. The secure line-of-sight communication with aircraft according to claim 1, wherein said sensor or camera provides user interface of one or more of: three dimensions, virtual reality interaction and augmented reality interaction.

10. The secure line-of-sight communication with aircraft according to claim 1, wherein said at least one tracking device includes a Global Positioning Satellite (GPS) sensor.

11. The secure line-of-sight communication with aircraft according to claim 10, wherein said Global Positioning Satellite (GPS) sensor establishes a direction for establishing at least an initial orientation for said first line-of-sight transceiver or said second line-of-sight transceiver.

12. The secure line-of-sight communication with aircraft according to claim 1, wherein said first aircraft or said second aircraft is launched from a moving vehicle, stationary location, or roving vehicle.

13. The secure line-of-sight communication with aircraft according to claim 1, further includes merging said sensor data with a location of said second user.

14. The secure line-of-sight communication with aircraft according to claim 13, further includes merging said sensor data from said first aircraft and said second aircraft and sending a merged signal to at least one of said first user and said second user.

15. The secure line-of-sight communication with aircraft according to claim 1, further includes at least a third user and at least a third aircraft.

16. The secure line-of-sight communication with aircraft according to claim 1, wherein said hazard is selected from a group consisting of a vehicle, a person, an aircraft, a rock, an avalanche or an animal.

* * * * *